United States Patent
Kitanaka et al.

(10) Patent No.: US 7,808,195 B2
(45) Date of Patent: Oct. 5, 2010

(54) CONTROL APPARATUS FOR ELECTRIC TRAIN

(75) Inventors: Hidetoshi Kitanaka, Chiyoda-ku (JP); Masaki Kono, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 422 days.

(21) Appl. No.: 12/063,748

(22) PCT Filed: May 15, 2006

(86) PCT No.: PCT/JP2006/309650

§ 371 (c)(1),
(2), (4) Date: Feb. 13, 2008

(87) PCT Pub. No.: WO2007/132515

PCT Pub. Date: Nov. 22, 2007

(65) Prior Publication Data

US 2010/0147184 A1   Jun. 17, 2010

(51) Int. Cl.
*H02P 7/00* (2006.01)
(52) U.S. Cl. ............... 318/442; 318/139; 318/254; 318/376; 307/9.1; 307/10.1; 290/40 C
(58) Field of Classification Search .......... 318/53, 318/54, 139, 254, 376, 442; 290/40 C; 307/9.1, 307/10.1
See application file for complete search history.

(56) References Cited

U.S. PATENT DOCUMENTS 3,665,495 A * 5/1972 Carter et al. ............... 307/67
5,780,980 A * 7/1998 Naito ........................ 318/139
6,107,926 A * 8/2000 Kifuku et al. .............. 340/650

(Continued)

FOREIGN PATENT DOCUMENTS

JP   57-183201 A   11/1982

(Continued)

OTHER PUBLICATIONS

*Form PCT/ISA/210 (International Search Report) dated Aug. 8, 2006.

*Primary Examiner*—Paul Ip
(74) *Attorney, Agent, or Firm*—Buchanan Ingersoll & Rooney PC

(57) ABSTRACT

To propose a control apparatus for an electric train, in which the regenerative energy of a DC power feed circuit can be consumed without disposing the brake chopper or electric-double-layer capacitor of the DC power feed circuit.

A control apparatus for an electric train according to this invention includes an AC electric motor which drives the electric train, and a variable-voltage variable-frequency inverter which controls the AC electric motor, and further includes an auxiliary power source device connected to a DC power feed circuit, and load control means for controlling a load connected to the auxiliary power source device, wherein the load control means receives an inverter state signal representative of an operation state of the variable-voltage variable-frequency inverter from the it, and the load control means controls the load in accordance with the inverter state signal. Besides, the control apparatus for the electric train includes detection means for detecting DC power feed information representative of the DC power feed state of the DC power feed circuit, and the load control means controls the load in accordance with the DC power feed information.

15 Claims, 7 Drawing Sheets

U.S. PATENT DOCUMENTS

| | | | |
|---|---|---|---|
| 6,177,734 B1* | 1/2001 | Masberg et al. | 290/31 |
| 6,211,681 B1* | 4/2001 | Kagawa et al. | 324/426 |
| 6,365,983 B1* | 4/2002 | Masberg et al. | 290/40 C |
| 6,930,460 B2* | 8/2005 | Ishikawa et al. | 318/442 |
| 7,088,065 B2* | 8/2006 | Ishikawa et al. | 318/376 |
| 7,256,513 B2* | 8/2007 | Kumar et al. | 307/9.1 |
| 7,439,634 B2* | 10/2008 | Michalko | 307/43 |
| 7,535,116 B2* | 5/2009 | Daigle et al. | 290/40 C |
| 2003/0146726 A1* | 8/2003 | Ishikawa et al. | 318/442 |
| 2004/0159480 A1* | 8/2004 | Ishikawa et al. | 180/65.3 |
| 2006/0061213 A1* | 3/2006 | Michalko | 307/9.1 |
| 2006/0119177 A1* | 6/2006 | Kumar et al. | 307/9.1 |
| 2007/0025130 A1* | 2/2007 | Hobraiche et al. | 363/131 |
| 2007/0151272 A1* | 7/2007 | Cosan et al. | 62/228.1 |
| 2008/0121136 A1* | 5/2008 | Mari et al. | 105/35 |
| 2008/0252182 A1* | 10/2008 | Daigle et al. | 310/75 R |
| 2009/0058326 A1* | 3/2009 | Oyobe et al. | 318/53 |
| 2009/0067205 A1* | 3/2009 | Oyobe et al. | 363/98 |
| 2010/0038962 A1* | 2/2010 | Komatsu | 307/10.1 |

FOREIGN PATENT DOCUMENTS

| | | |
|---|---|---|
| JP | 1-259701 A | 10/1989 |
| JP | 9-247807 A | 9/1997 |
| JP | 2002-191102 A | 7/2002 |
| JP | 2003-199204 A | 7/2003 |
| JP | 2004-104976 A | 4/2004 |

* cited by examiner

CONTROL APPARATUS FOR ELECTRIC TRAIN

TECHNICAL FIELD

This invention relates to a control apparatus for an electric train, wherein an AC electric motor is used as a drive source, and the AC electric motor is controlled by a variable-voltage variable-frequency inverter.

BACKGROUND ART

In case of an electric train, during ordinary braking, electrical braking based on regenerative braking is performed to convert the inertial energy of a vehicle into electric energy, and to restore the regenerative energy to an overhead line, that is, a DC power feed line. In the regenerative braking, it is indispensable that the side of the DC power feed line has a regenerativity, or that another electric train under power running as acts as a regenerative load exists on the DC power feed line side.

Here, in a case where the regenerative energy of the electric train in the regenerative braking state is greater than power which is consumed by the electric train in the power running state, the voltage of the overhead line or the voltage of a filter capacitor disposed at a stage preceding an inverter increases to an overvoltage, and a protective function is sometimes actuated. As means for improving this problem, it is common practice that the regenerative power from the electric train in the regenerative braking state is fined to lower a braking force based on the regenerative braking, and that the lowered component of the braking force is compensated by mechanical braking. In this case, however, a brake shoe wears off due to the mechanical braking, and hence, the maintenance of the brake shoe needs to be performed in a certain fixed period.

In order to avoid the wear of the brake shoe, it has been known that a brake chopper which consists of a switching element and a resistor is disposed on the DC side of the inverter. In this case, when the regenerative power based on the electrical braking is great to raise the DC output voltage of the inverter, the brake chopper is operated to consume the regenerative power. Since, however, the brake chopper is added to a control apparatus in this case, there has been the problem that the control apparatus becomes large in size and high in fabrication cost.

In FIG. 1 of JP2003-199204A (Patent Document 1), it is disclosed that an electric-double-layer capacitor which can store regenerative energy is employed instead of the brake chopper. In this patent document 1, in a control apparatus for an electric train, wherein a smoothing capacitor is disposed in a DC power feed circuit which is connected to a DC power feed line through a collector shoe and wherein a DC voltage smoothed by the smoothing capacitor is fed to a variable-voltage variable-frequency inverter, the electric-double-layer capacitor is connected in parallel with the smoothing capacitor through a DC/DC converter having a switching element, and in a regenerative braking state, regenerative energy from the inverter is stored in the electric-double-layer capacitor, whereas in a power running state or a coasting running state, the energy stored in the electric-double-layer capacitor is fed to the power feed line or the inverter.

Also, in FIG. 10 of JP2004-104976A (Patent Document 2), it is disclosed that an electric-double-layer capacitor is employed instead of a brake chopper circuit for the purpose of storing regenerative energy.

Patent Document 1: JP2003-199204A (Claim 1, FIG. 1)

Patent Document 2: JP2004-104976A (Sector 0072, FIG. 10)

DISCLOSURE OF THE INVENTION

Problems that the Invention is to Solve

As stated above, in the prior-art control apparatus for an electric train, for the purpose of avoiding the wear of a brake shoe and effectively utilizing regenerative energy, it has been known to mount a brake chopper or to employ an electric-double-layer capacitor capable of storing the regenerative energy. However, it has been necessary to add the brake chopper or the electric-double-layer capacitor, and there has been the drawback that the control apparatus becomes large in size and high in fabrication cost.

This invention has been made in order to solve the above problem, and it has for its object to propose an improved control apparatus for an electric train as can consume surplus regenerative energy by utilizing the load of an auxiliary power source device, without adding the brake chopper or the electric-double-layer capacitor.

Means for Solving the Problems

A control apparatus for an electric train according to the first viewpoint of this invention, is configured including an AC electric motor which drives the electric train, and a variable-voltage variable-frequency inverter which controls the AC electric motor, wherein the variable-voltage variable-frequency inverter has DC side terminals which are connected to a DC power feed circuit of the electric train, and AC side terminals which are connected to the AC electric motor, and wherein, in a power running state of the electric train, the variable-voltage variable-frequency inverter converts DC electric power fed from the DC power feed circuit to the DC side terminals, into AC electric power, so as to feed the AC electric power from the AC side terminals to the AC electric motor, while in a regenerative braking state of the electric train, it converts AC electric power fed from the AC electric motor to the AC side terminals, into DC electric power, so as to feed the DC electric power from the DC side terminals to the DC power feed circuit. The control apparatus further includes an auxiliary power source device connected to the DC power feed circuit and load control means for controlling a load connected to the auxiliary power source device, wherein the load control means receives an inverter state signal representative of an operation state of the variable-voltage variable-frequency inverter from it, and the control means controls the load in accordance with the inverter state signal.

Besides, a control apparatus for an electric train according to the second viewpoint of this invention, is configured including an AC electric motor which drives the electric train, and a variable-voltage variable-frequency inverter which controls the AC electric motor, wherein the variable-voltage variable-frequency inverter has DC side terminals which are connected to a DC power feed circuit of the electric train, and AC side terminals which are connected to the AC electric motor, and wherein, in a power running state of the electric train, the variable-voltage variable-frequency inverter converts DC electric power fed from the DC power feed circuit to the DC side terminals, into AC electric power, so as to feed the AC electric power from the AC side terminals to the AC electric motor, while in a regenerative braking state of the electric train, it converts AC electric power fed from the AC electric motor to the AC side terminals, into DC electric power, so as to feed the DC electric power from the DC side terminals to the DC power feed circuit. The control apparatus further includes an auxiliary power source device connected to the DC power feed circuit, load control means for controlling a load connected to the auxiliary power source device, and detection means for detecting DC power feed information representative of a DC power feed state of the DC power feed circuit, wherein the load control means controls the load in accordance with the DC power feed information.

ADVANTAGE OF THE INVENTION

In the control apparatus for the electric train according to the first viewpoint of this invention, the load control means receives the inverter state signal representative of the operation state of the variable-voltage variable-frequency inverter from it, and the control means controls the load connected to the auxiliary power source device, in accordance with the inverter state signal, so that the regenerative energy of the DC power feed circuit can be consumed by the load of the auxiliary power source device without disposing a brake chopper or an electric-double-layer capacitor in the DC power feed circuit.

In the control apparatus for the electric train according to the second viewpoint of this invention, the load control means receives the DC power feed information of the DC power feed circuit, and it controls the load connected to the auxiliary power source device, in accordance with the DC power feed information, so that the regenerative energy of the DC power feed circuit can be consumed by the load of the auxiliary power source device without disposing a brake chopper or an electric-double-layer capacitor in the DC power feed circuit.

BEST MODE FOR CARRYING OUT THE INVENTION

Now, several embodiments of a control apparatus for an electric train according to this invention will be described with reference to the drawings.

Embodiment 1

FIG. 1 is a block diagram showing Embodiment 1 of a control apparatus for an electric train according to this invention. The control apparatus 10 for the electric train in Embodiment 1 is the control apparatus installed in the electric train 1. The electric train 1 includes a wheel 2, and a collector shoe 3. The wheel 2 runs on a track 4, and the collector shoe 3 touches an overhead line, that is, a DC power feed line 5 and receives the feed of DC electric power from the DC power feed line 5. The DC power feed line 5 feeds DC electric power to a plurality of electric trains including the electric train 1. The prescribed voltage VD0 of the DC power feed line 5 is set at, for example, 1500 (V) or 750 (V).

The control apparatus 10 includes an AC electric motor 11, an inverter 12, a DC power feed circuit 15, an AC power feed circuit 18, an auxiliary power source device 22, a load 25, and load control means 30.

The AC electric motor 11 is the drive source of the electric train 1, and it drives the wheel 2. This AC electric motor 11 is an AC induction motor of, for example, three phases. The inverter 12 is a variable-voltage variable-frequency inverter (VVVF inverter), and it is configured by employing, for example, a thyristor. This inverter 12 has a pair of DC side terminals 13, and three-phase AC side terminals 14. The DC side terminals 13 are connected to the DC power feed circuit 15. The DC voltage of the DC power feed circuit 15 is let be "VD". The AC side terminals 14 are connected to the AC electric motor 11 through the AC power feed circuit 18. The AC power feed circuit 18 is a three-phase AC power feed circuit. The three-phase AC voltage of the AC power feed circuit 18 is let be "VAC".

The DC power feed circuit 15 includes a reactor 16 and a smoothing capacitor 17, and it connects the DC side terminals 13 of the inverter 12 with the collector shoe 3 and the wheel 2. One end of the reactor 16 is connected to the collector shoe 3, while the other end thereof is connected to the plus side terminal of the DC side terminals 13 of the inverter 12. The minus side terminal of the DC side terminals 13 is directly connected to the wheel 2, and it is earthed through the wheel 2 as well as the track 4. One end of the smoothing capacitor 17 is connected between the reactor 16 and the plus side terminal of the DC side terminals 13, while the other end thereof is connected to the minus side terminal of the DC side terminals 13. The smoothing capacitor 17 is connected across the pair of DC side terminals 13 and in parallel therewith.

A power running command FD and a regenerative braking command FB are given from the driver's stand of the electric train 1 to the inverter 12. The power running command FD and the regenerative braking command FB are given to the inverter 12 in the travel state of the electric train. The power running command FD is given in a state where the electric train 1 is brought into power running. When the power running command FD is given, the inverter 12 performs the conversion operation of converting the DC electric power from the DC power feed circuit 15, into three-phase AC electric power, and it generates converted output voltages on the basis of the conversion operation. The AC voltage value and frequency of the three-phase AC voltage VAC to be outputted from the inverter 12 are controlled in accordance with the command contents of the power running command FD. The three-phase AC electric power outputted from the inverter 12 is fed to the AC electric motor 11 through the AC power feed circuit 18 so as to drive this AC electric motor 11.

The regenerative braking command FB is given in a state where the electric train 1 is to be regeneratively braked during the travel of the electric train 1. When the regenerative braking command FB is given, the inverter 12 receives the feed of three-phase AC electric power generated by the AC electric motor 11, from the AC power feed circuit 18, it performs the conversion operation of converting the three-phase AC electric power into DC electric power, and it generates a converted output voltage on the basis of the conversion operation. The DC electric power outputted from the inverter 12 is fed from the inverter 12 to the DC power feed circuit 15.

The inverter 12 falls into an inverter stop state SC when it receives neither of the power running command FD and the regenerative braking command FB. Even in the travel state, when the electric train 1 falls into a coasting travel state, the inverter 12 falls into the inverter stop state SC. Besides, when the electric train 1 stops temporarily, the inverter 12 falls into the inverter stop state SC. In the inverter stop state SC, the inverter 12 stops the conversion operation between the DC electric power and the AC electric power, and hence, the converted output voltage is not generated. In this inverter stop state SC, DC electric power is fed from the DC power feed circuit 15 to the DC side terminals 13 of the inverter 12, but the DC electric power is not converted into three-phase AC electric power. Besides, in the inverter stop state SC, even when the AC electric motor 11 generates three-phase AC electric power, the three-phase AC electric power is not converted into DC electric power.

The auxiliary power source device 22 is, for example, a constant-voltage constant-frequency inverter, and it has a pair of DC side terminals 23 and a pair of single-phase AC side terminals 24. The DC side terminals 23 of the auxiliary power source device 22 are connected to the DC power feed circuit 15, while the AC side terminals 24 thereof are connected to the load 25.

The load 25 is the AC electric equipment of the electric train 1, and it includes, at least, the in-room heater 26 and in-room air conditioner 27 of the electric train 1. By way of example, the in-room heater 26 is arranged under a seat within the car room of the electric train 1, and the in-room air conditioner 27 is arranged at a ceiling within the car room of the electric train 1. The in-room heater 26 and in-room air conditioner 27 receives the feed of a single-phase AC voltage from the AC side terminals 24 of the auxiliary power source device 22, and they are turned ON/OFF by the control of the load control means 30. Incidentally, although not shown, the in-room illumination lamp of the electric train 1 is also included in the load 25. The illumination lamp is connected so as to normally receive the feed of the single-phase AC voltage from the auxiliary power source device 22, without resorting to the load control means 30. Also the illumination lamp, however, can be turned ON/OFF by the load control means 30, together with the in-room heater 26 and in-room air conditioner 27.

The load control means 30 is configured of, for example, a microcomputer, and it has a CPU and a memory. The load control means 30 in Embodiment 1 receives an inverter state signal ICS-FD/FB from the inverter 12, and it ON/OFF-controls the in-room heater 26 and in-room air conditioner 27 on the basis of the inverter state signal ICS-FD/FB. In Embodiment 1, the inverter state signal ICS-FD/FB represents the state where the power running command FD is given to the inverter 12, and the state where the regenerative braking command FB is given to the inverter 12, and it becomes a high level signal in the state where the power running command FD is given to the inverter 12, and the state where the regenerative braking command FB is given to the inverter 12.

FIG. 2 is a block diagram showing the details of the load control means 30 in Embodiment 1. The load control means 30 has a voltage generation table 31. This load control means receives the inverter state signal ICS-FD/FB, and it generates load start signals LDS1 and LDS2 by utilizing the voltage generation table 31. The load start signal LDS1 is a start signal for the in-room heater 26, while the load start signal LDS2 is a start signal for the in-room air conditioner 27. When the inverter state signal ICS-FD/FB has become the high level signal on the basis of the inverter state signal ICS-FD/FB, in other words, the inverter 12 is generating the converted output voltage, the voltage generation table 31 sets the load start signals LDS1 and LDS2 at ON signals and simultaneously brings the in-room heater 26 and in-room air conditioner 27 into ON states. When the inverter 12 has fallen into the inverter stop state SC, this inverter 12 does not generate the converted output voltage, and the inverter state signal ICS-FD/FB becomes a low level signal, so that the load start signals LDS1 and LDS2 become OFF signals, and both the in-room heater 26 and the in-room air conditioner 27 are brought into OFF states.

Next, an operation will be described. When the power running command FD is given to the inverter 12, this inverter 12 converts DC electric power from the DC power feed circuit 15, into three-phase AC electric power and feeds the AC electric power to the AC electric motor 11, so that the DC voltage VD lowers. Besides, when the regenerative braking command FB is given to the inverter 12, the DC voltage VD rises on condition that a regenerative load on the side of the DC power feed line 5 is low. In Embodiment 1, in a state where the power running command FD is given to the inverter 12, and a state where the regenerative braking command FB is given to the inverter 12, the inverter state signal ICS-FD/FB becomes a high level signal, and both the load start signals LDS1 and LDS2 of the load control means 30 become ON signals on the basis of this inverter state signal ICS-FD/FB, whereby the in-room heater 26 and the in-room air conditioner 27 fall into ON states, and the in-room heater 26 and in-room air conditioner 27 are simultaneously fed with electric power from the auxiliary power source device 22.

Even in the state where the in-room heater 26 and in-room air conditioner 27 are simultaneously operated, a temperature within the car room can be adjusted into a comfortable condition by appropriately setting the adjustment setting temperatures of the heater and air conditioner. By way of example, the adjustment temperatures of the in-room heater 26 and in-room air conditioner 27 are both set at a comfortable temperature, for example, 20 (° C.), whereby by way of example, in summer, the interior of the car room is brought into a cooled state as compared with the exterior of the car room, and in winter, the interior of the car room is brought into a heated state as compared with the exterior of the car room, so that the comfortable temperature can be established.

In the state where the power running command FD is given to the inverter 12, the inverter 12 and the load 25 of the auxiliary power source device 22 form the regenerative load of another electric train connected to the identical DC power feed line 5, and the regenerative energy of the other electric train can be consumed. Besides, in the state where the regenerative braking command FB is given to the inverter 12, the load 25 of the auxiliary power source device 22 consumes the regenerative energy of the inverter 12. Besides, if the inverter 12 falls into the inverter stop state SC, the inverter state signal ICS-FD/FB becomes a low level signal, and both the load start signals LDS1 and LDS2 of the load control means 30 become OFF signals, so that both the in-room heater 26 and in-room air conditioner 27 of the load 25 of the auxiliary power source device 22 are brought into OFF states.

In this manner, in the control apparatus 10 for the electric train in Embodiment 1, in the state where the power running command FD is given to the inverter 12, the load control means 30 brings both the in-room heater 26 and in-room air conditioner 27 forming the load 25 of the auxiliary power source device 22, into the ON states, so that the inverter 12 and the load 25 of the auxiliary power source device 22 form the regenerative load of the other electric train and can consume the regenerative energy of the other electric train. Besides, even in the state where the regenerative braking command FB is given to the inverter 12, the load control means 30 brings both the in-room heater 26 and in-room air conditioner 27 forming the load 25 of the auxiliary power source device 22, into the ON states, so that the load 25 of the auxiliary power source device 22 can be set as the regenerative load of the inverter 12. Thus, even if a regenerative load on the side of the DC power feed line 5 is insufficient, the load 25 of the auxiliary power source device 22 can be set as the regenerative load of the inverter 12, and the voltage rise of the DC power feed circuit 15 can be suppressed. Accordingly, the regenerative energy can be consumed without adding a brake chopper or an electric-double-layer capacitor to the control apparatus 10, to bring forth the advantages that the wear of a brake shoe which affords mechanical braking during regenerative braking can be avoided, and that the control apparatus 10 can be made small in size.

Besides, in Embodiment 1, the in-room heater 26 and in-room air conditioner 27 of the electric train 1 are simultaneously turned ON/OFF by the load control means 30. In this regard, even in the state where the in-room heater 26 and the in-room air conditioner 27 are simultaneously operated, a temperature within the car room of the electric train 1 can be adjusted to a comfortable temperature by appropriately setting the adjustment setting temperatures of the heater and the air conditioner.

Embodiment 2

FIG. 3 is a block diagram showing Embodiment 2 of a control apparatus for an electric train according to this invention, while FIG. 4 is a block diagram showing the details of load control means 30A for use in this embodiment 2.

In Embodiment 1, the in-room heater 26 and the in-room air conditioner 27 which form the load 25 of the auxiliary power source device 22 are simultaneously ON/OFF-controlled by the load control means 30 on the basis of the inverter state signal ICS-FD/FB, whereas in this embodiment 2, detection means 20 for detecting the DC power feed information DIF of a DC power feed circuit 15 is added to the DC power feed circuit 15, and the in-room heater 26 and the in-room air conditioner 27 which form the load 25 of the auxiliary power source device 22 are simultaneously ON/OFF-controlled by the load control means 30A on the basis of the inverter state signal ICS-FD/FB and the DC power feed information DIF. The others are configured to be the same as in Embodiment 1.

According to this embodiment 2, the in-room heater 26 and the in-room air conditioner 27 which form the load 25 of the auxiliary power source device 22 are simultaneously ON/OFF-controlled on the basis of the inverter state signal ICS-FD/FB and the DC power feed information DIF of the DC power feed circuit 15, so that the in-room heater 26 and the in-room air conditioner 27 which form the load 25 of the auxiliary power source device 22 can be controlled more exactly in accordance with a load state on the side of a DC power feed line 5.

The control apparatus for the electric train in Embodiment 2 is indicated by reference sign 10A. This control apparatus 10A for the electric train is such that the detection means 20 is added to the control apparatus 10 in Embodiment 1. This detection means 20 is concretely a voltage sensor, which detects a DC voltage VD applied across a smoothing capacitor 17 and which supplies the load control means 30A with the DC power feed information DIF representative of the DC voltage VD.

As shown in FIG. 4, the load control means 30A in Embodiment 2 has a voltage generation table 32 and a logical product circuit (AND circuit) 33 in addition to a voltage generation table 31. The output of the voltage generation table 31 and the output of the voltage generation table 32 are both inputted to the logical product circuit 33, and this logical product circuit 33 generates load start signals LDS1 and LDS2. The DC power feed information DIF from the detection means 20 is supplied to the voltage generation table 32. This voltage generation table 32 outputs an ON signal when the DC voltage VD in the DC power feed circuit 15 has exceeded a predetermined voltage value VD1 greater than the prescribed voltage VD0 of the DC power feed line 5. By way of example, in a case where the prescribed voltage VD0 of the DC power feed line 5 is 1500 (V), the predetermined voltage value VD1 is set at 1850-1900 (V), and in a case where the prescribed voltage VD0 is 750 (V), the predetermined voltage value VD1 is set at 850-900 (V).

The voltage generation table 32 of the load control means 30A outputs the ON signal when the DC voltage VD in the DC power feed circuit 15 has exceeded the predetermined voltage value VD1. Concretely, in a state where a power running command FD is given to an inverter 12, the inverter 12 converts DC electric power to three-phase AC electric power and feeds the AC electric power to an AC electric motor 11, so that the DC voltage VD lowers. However, in a case where regenerative energy from a plurality of other electric trains connected to the DC power feed line 5 is great, the DC voltage VD exceeds the predetermined voltage value VD1. Besides, in a state where a regenerative braking command FB is given to the inverter 12, this inverter 12 converts three-phase AC electric power generated by the AC electric motor 11, into DC electric power and feeds the DC electric power to the DC power feed circuit 15. Therefore, if a regenerative load on the side of the DC power feed line 5 is low, the DC voltage VD rises and exceeds the predetermined voltage value VD1.

In the same manner as in Embodiment 1, the voltage generation table 31 outputs an ON signal on the basis of the inverter state signal ICS-FD/FB, when this inverter state signal ICS-FD/FB has become a high level signal, in other words, when the inverter 12 is generating a converted output voltage, in the state where the power running command FD is given to the inverter 12, and in the state where the regenerative braking command FB is given to the inverter 12. When both the voltage generation tables 31 and 32 have outputted the ON signals, the logical product circuit 33 sets the load start signals LDS1 and LDS2 at ON signals and brings both the in-room heater 26 and in-room air conditioner 27 of the load 25 into ON states.

In this embodiment 2, when the DC voltage VD has exceeded the predetermined voltage value VD1 in the state where the power running command FD is given to the inverter 12, and when the DC voltage VD has exceeded the predetermined voltage value VD1 in the state where the regenerative braking command FB is given to the inverter 12, the in-room heater 26 and in-room air conditioner 27 of the load 25 are simultaneously started on the basis of the output voltage of the auxiliary power source device 22, and the DC electric power of the DC power feed circuit 15 can be effectively consumed.

In both the state where the power running command FD is given to the inverter 12 and the state where the regenerative braking command FB is given to the inverter 12, when the DC voltage VD in the DC power feed circuit 15 has lowered to the predetermined voltage value VD1 or below, the ON signal fails to be outputted from the voltage generation table 32, so that both the load start signals LDS1 and LDS2 become OFF signals, and the power feed to the in-room heater 26 and in-room air conditioner 27 of the load 25 is stopped. When the inverter 12 has fallen into an inverter stop state SC, the ON signal fails to be outputted from the voltage generation table 31, so that the power feed to the in-room heater 26 and in-room air conditioner 27 of the load 25 is similarly stopped.

In Embodiment 2, as in Embodiment 1, there are attained the advantages that regenerative energy can be effectively consumed, that the wear of a brake shoe which affords mechanical braking during regenerative braking can be avoided, and that the control apparatus 10A can be made small in size, without adding a brake chopper or an electric-double-layer capacitor to the control apparatus 10A. Besides, the in-room air conditioner and in-room heater of the load 25 of the auxiliary power source device 22 are started on the basis of also the DC power feed information DIF of the DC power feed circuit 15, and hence, only when the load on the side of the DC power feed line 5 is low, the load 25 of the auxiliary power source device 22 can be started, to attain the advantage that the energy can be effectively consumed.

By the way, in Embodiment 2, the detection means 20 has been configured as the voltage sensor so as to detect the DC voltage VD from the voltage of the smoothing capacitor 17. However, the DC voltage of the DC power feed line 5 can also be detected on the input side of a reactor 16, and the same advantages can be attained in this case. Besides, preciser DC power feed information DIF can be obtained in such a way that a current sensor is disposed in series with the reactor 16, that the DC electric power of the DC power feed circuit 15 is calculated on the basis of the voltage sensor output and current sensor output of the detection means 20, and that the calculated DC electric power is used as the DC power feed information DIF.

Embodiment 3

FIG. 5 is a block diagram showing Embodiment 3 of a control apparatus for an electric train according to this invention, while FIG. 6 is a block diagram showing the details of load control means 30B for use in this embodiment 3. The control apparatus for the electric train in this embodiment 3 is indicated by reference sign 10B. This control apparatus 10B for the electric train is such that the load control apparatus 30A in Embodiment 2 is replaced with the load control means 30B, and the others are configured to be the same as in Embodiment 2.

The load control means 30B for use in Embodiment 3 has voltage generation tables 31 and 32 and a logical product circuit 33, likewise to the load control means 30A used in Embodiment 2, but an inverter state signal ICS-FD is inputted to the voltage generation table 31. The inverter state signal ICS-FD is a signal representative of a powering command signal FD which is given to an inverter 12, and this inverter state signal ICS-FD becomes a high level signal in a state where the powering command signal FD is given to the inverter 12, whereas it becomes a low level signal in both a state where a regenerative braking command FB is given to the inverter 12 and a state where the inverter 12 has fallen into an inverter stop state SC.

The voltage generation table 31 of the load control means 30B outputs an ON signal when the inverter state signal ICS-FD has become the high level signal, in other words, when the inverter 12 is generating a converted output voltage of AC, in the state where the power running command ED is given to the inverter 12. In the state where the regenerative braking command FB is given to the inverter 12, and the state where the inverter 12 has fallen into the inverter stop state SC, the inverter state signal ICS-FD becomes the low level signal, and hence, the voltage generation table 31 outputs an OFF signal. In the same manner as in Embodiment 2, the voltage generation table 32 of the load control means 30B outputs an ON signal when a DC voltage VD in a DC power feed circuit 15 has exceeded a predetermined voltage value VD1. In the state where the power running command FD is given to the inverter 12, this inverter 12 converts DC electric power from the DC power feed circuit 15, into three-phase AC electric power and feeds the AC electric power to an AC electric motor 11, so that the DC voltage VD lowers. However, in a case where regenerative electric power from a plurality of other electric trains connected to a DC power feed line 5 is great, the DC voltage VD exceeds the predetermined voltage value VD1.

In a state where both the voltage generation tables 31 and 32 generate the ON signals, the logical product circuit 33 in Embodiment 3 sets load start signals LDS1 and LDS2 at ON signals, so as to simultaneously start the in-room heater 26 and in-room air conditioner 27 of the load 25 of an auxiliary power source device 22. In this embodiment 3, when the DC voltage VD has exceeded the predetermined voltage value VD1 in the state where the power running command FD is given to the inverter 12, the load start signals LDS1 and LDS2 become the ON signals to simultaneously start the in-room heater 26 and in-room air conditioner 27 of the load 25, whereby the DC energy of the DC power feed circuit 15 is effectively consumed.

Accordingly, also in Embodiment 3, as in Embodiment 1, there are attained the advantages that the regenerative energy can be effectively consumed, that the wear of a brake shoe which affords mechanical braking during regenerative braking can be avoided, and that the control apparatus 10B can be made small in size, without adding a brake chopper or an electric-double-layer capacitor to the control apparatus 10B. Besides, the in-room heater 26 and the in-room air conditioner 27 are simultaneously started in accordance with the DC power feed information DIF of the DC power feed circuit 15, so that only when the load on the side of the DC power feed line 5 is low, the in-room heater 26 and in-room air conditioner 27 of the load 25 of the auxiliary power source device 22 can be started.

Embodiment 4

FIG. 7 is a block diagram showing Embodiment 4 of a control apparatus for an electric train according to this invention, while FIG. 8 is a block diagram showing the details of load control means 30C in this embodiment 4. The control apparatus for the electric train in this embodiment 4 is indicated by reference sign 100. This control apparatus 10C for the electric train is such that the load control means 30A in Embodiment 2 is replaced with the load control means 300, and the others are configured to be the same as in Embodiment 2.

The load control means 30C for use in Embodiment 4 has voltage generation tables 31 and 32 and a logical product circuit 33, likewise to the load control means 30A used in Embodiment 2, but an inverter state signal ICS-FB is inputted to the voltage generation table 31. The inverter state signal ICS-FB is a signal representative of a regenerative braking command FB which is given to an inverter 12, and this inverter state signal ICS-FB becomes a high level signal in a state where the regenerative braking command FB is given to the inverter 12, whereas it becomes a low level signal in both a state where a power running command FD is given to the inverter 12 and a state where the inverter 12 has fallen into an inverter stop state Sc.

The voltage generation table 31 of the load control means 30C outputs an ON signal when the inverter state signal ICS-FB has become the high level signal, in other words, when the inverter 12 is generating a DC converted output voltage, in the state where the regenerative braking command FB is given to the inverter 12. In the state where the power running command FD is given to the inverter 12, and the state where the inverter 12 has fallen into the inverter stop state Sc, the inverter state signal ICS-FB becomes the low level signal, and hence, the voltage generation table 31 outputs an OFF signal. In the same manner as in Embodiment 2, the voltage generation table 32 of the load control means 30C outputs an ON signal when a DC voltage VD in a DC power feed circuit 15 has exceeded a predetermined voltage value VD1 by way of example. In the state where the regenerative braking command FB is given to the inverter 12, this inverter 12 converts three-phase AC electric power generated by an AC electric motor 11, into DC electric power and feeds the DC electric power to the DC power feed circuit 15, so that if a regenerative load on the side of a DC power feed line 5 is low, the DC voltage VD of the DC power feed circuit 15 rises to exceed a predetermined voltage value VD1.

In a state where both the voltage generation tables 31 and 32 generate the ON signals, the logical product circuit 33 in Embodiment 4 sets load start signals LDS1 and LDS2 at ON signals, so as to simultaneously start the in-room heater 26 and in-room air conditioner 27 of the load 25 of an auxiliary power source device 22. In this embodiment 4, when the DC voltage VD has exceeded the predetermined voltage value VD1 in the state where the regenerative braking command FB is given to the inverter 12, the load start signals LDS1 and LDS2 become the ON signals to simultaneously start the in-room heater 26 and in-room air conditioner 27, whereby the regenerative energy of the DC power feed circuit 15 is effectively consumed.

Accordingly, also in Embodiment 4, as in Embodiment 1, there are attained the advantages that the regenerative energy can be effectively consumed, that the wear of a brake shoe which affords mechanical braking during regenerative braking can be avoided, and that the control apparatus 10C can be made small in size, without adding a brake chopper or an electric-double-layer capacitor to the control apparatus 10C. Besides, the in-room heater 26 and the in-room air conditioner 27 are simultaneously started in accordance with the DC power feed information DIF of the DC power feed circuit 15, so that only when the load on the side of the DC power feed line 5 is low, the in-room heater 26 and in-room air conditioner 27 of the load 25 of the auxiliary power source device 22 can be started.

Embodiment 5

FIG. 9 is a block diagram showing Embodiment 5 of a control apparatus for an electric train according to this invention, while FIG. 10 is a block diagram showing the details of load control means 30D for use in this embodiment 5.

The control apparatus for the electric train in this embodiment 5 is indicated by reference sign 10D. This control apparatus 10D for the electric train has the load control means 30D, by which an in-room heater 26 and an in-room air conditioner 27 that are included in the load 25 of an auxiliary power source device 22 are controlled. The load control means 30D is supplied with an inverter state signal ICS from an inverter 12, and this inverter state signal ICS includes an inverter state signal ICS-FD/FB/SC and an inverter state signal ICS-FD/FB. The load control means 30D ON/OFF-controls the in-room heater 26 and the in-room air conditioner 27 and also controls the load states thereof, on the basis of these inverter state signals ICS-FD/FB/SC and ICS-FD/FB. The others are configured to be the same as in Embodiment 1.

The inverter state signal ICS-FD/FB/SC becomes a high level signal in any of a state where a power running command FD is given to the inverter 12, a state where a regenerative braking command FB is given to the inverter 12, and a state where the inverter 12 has fallen into an inverter stop state SC.

As shown in FIG. 10, the load control means 30D has four voltage generation tables 34, 35, 36 and 37. The voltage generation table 34 is supplied with the inverter state signal ICS-FD/FB/SC. The inverter state signal ICs-FD/FB/SC becomes the high level signal in any of the state where the power running command FD is given to the inverter 12, the state where the regenerative braking command FB is given to the inverter 12, and the state where the inverter 12 has fallen into the inverter stop state SC, so that the voltage generation table 34 sets a load start signal LDSa at an ON signal normally irrespective of whether the inverter 12 is generating a converted output voltage or is not generating the converted output voltage.

The voltage generation table 35 is supplied with the inverter state signal ICS-FD/FB. This inverter state signal ICS-FD/FB becomes a high level signal in the state where the power running command FD is given to the inverter 12, and the state where the regenerative braking command FB is given to the inverter 12. The voltage generation table 35 sets a load start signal LDSb at an ON signal on the basis of the inverter state signal ICS-FD/FB, when this inverter state signal ICS-FD/FB has become the high level signal, in other words, when the inverter 12 is generating the converted output voltage.

The voltage generation tables 36 and 37 are supplied with the inverter state signal ICS-FD/FB. The voltage generation table 36 sets a high load signal LDTa at an ON signal on the basis of the inverter state signal ICS-FD/FB, when this inverter state signal ICS-FD/FB has become the high level signal, in other words, when the inverter 12 is generating the converted output voltage. Besides, likewise to the voltage generation table 36, the voltage generation table 37 sets a high load signal LDTb at an ON signal on the basis of the inverter state signal ICS-FD/FB, when this inverter state signal ICS-FD/FB has become the high level signal, in other words, when the inverter 12 is generating the converted output voltage. The high load signals LDTa and LDTb change the in-room heater 26 and the in-room air conditioner 27 from low load states into high load states when they have become the ON signals, respectively.

The load start signals LDSa and LDSb and the high load signals LDTa and LDTb which are outputted from the load control means 30D are set into the following first states in summer:

Load start signal LDSa: Start signal for in-room air conditioner 27

Load start signal LDSb: Start signal for in-room heater 26

High load signal LDTa: Signal for changing in-room air conditioner 27 into high load state High load signal LDTb: Signal for changing in-room heater 26 into high load state Concretely, in summer, the load start signal LDSa of the voltage generation table 34 normally becomes the ON signal on the basis of the inverter state signal ICS-FD/FB/SC, and the in-room air conditioner 27 is normally started by the ON signal of the load start signal LDSa. When the power running command FD or the regenerative braking command FB is given to the inverter 12, the inverter state signal ICS-FD/FB becomes the high level signal, and hence, all of the load start signal LDSb and the high load signals LDTa and LDTb which are outputted from the respective voltage generation tables 35, 36 and 37 become the ON signals. The in-room heater 26 is started by the ON signal of the load start signal LDSb. Besides, the adjustment setting temperature of the in-room air conditioner 27 is lowered by the ON signal of the high load signal LDTa, and the in-room air conditioner 27 changes into the high load state. Besides, the adjustment setting temperature of the in-room heater 26 is raised by the ON signal of the high load signal LDTb, and the in-room heater 26 falls into the high load state.

In other words, in summer, the in-room air conditioner 27 is normally held in the ON state on the basis of the inverter state signal ICS-FD/FB/SC, thereby to normally cool the interior of a car room. Here, when the power running command FD or the regenerative braking command FB is given to the inverter 12 in the ON state of the in-room air conditioner 27, the in-room air conditioner 27 changes into the high load state, and the in-room heater 26 operates in the high load state, on the basis of the inverter state signal ICS-FD/FB. Since the in-room heater 26 falls into the high load state, the consumption energy of the in-room heater 26 increases. Besides, since the in-room air conditioner 27 falls into the high load state, the consumption energy of the in-room air conditioner 27 increases. Owing to the operations of the in-room air conditioner 27 and the in-room heater 26 in the high load states, the regenerative energy of a DC power feed circuit 15 can be consumed more.

The load start signals LDSa and LDSb and the high load signals LDTa and LDTb which are outputted from the load control means 30D are set into the following second states in winter:

Load start signal LDSa: Start signal for in-room heater 26

Load start signal LDSb: Start signal for in-room air conditioner 27

High load signal LDTa: Signal for changing in-room air conditioner 27 into high load state High load signal LDTb: Signal for changing in-room heater 26 into high load state Concretely, in winter, the load start signal LDSa of the voltage generation table 34 normally becomes the ON signal on the basis of the inverter state signal ICS-FD/FB/SC, and the in-room heater 26 is normally started by the ON signal of the load start signal LDSa. When the power running command FD or the regenerative braking command FB is given to the inverter 12, the inverter state signal ICS-FD/FB becomes the high level signal, and hence, all of the load start signal LDSb and the high load signals LDTa and LDTb of the respective voltage generation tables 35, 36 and 37 become the ON signals. The in-room air conditioner 27 is started by the ON signal of the load start signal LDSb. Besides, the adjustment setting temperature of the in-room air conditioner 27 is lowered by the ON signal of the high load signal LDTa, and the in-room air conditioner 27 changes into the high load state. Besides, the adjustment setting temperature of the in-room heater 26 is raised by the ON signal of the high load signal LDTb, and the in-room heater 26 falls into the high load state.

In other words, in winter, the in-room heater 26 is normally operated on the basis of the inverter state signal ICS-FD/FB/SC, thereby to normally heat the interior of the car room. Here, when the power running command FD or the regenerative braking command FB is given to the inverter 12 in the ON state of the in-room heater 26, the in-room heater 26 changes into the high load state, and the in-room air conditioner 27 operates in the high load state, on the basis of the inverter state signal ICS-FD/FB. Since the in-room heater 26 falls into the high load state, the consumption energy of the in-room heater 26 increases. Besides, since the in-room air conditioner 27 falls into the high load state, the consumption energy of the in-room air conditioner 27 increases. Owing to the operations of the in-room heater 26 and the in-room air conditioner 27 in the high load states, the regenerative energy of the DC power feed circuit 15 can be consumed more.

In this embodiment 5, when the power running command FD or the regenerative braking command FB is given to the inverter 12, the in-room heater 26 and the in-room air conditioner 27 are both operated in the high load states, and hence, the regenerative energy of the DC power feed circuit 15 is effectively consumed. Accordingly, also in Embodiment 5, as in Embodiment 1, there are attained the advantages that the regenerative energy can be effectively consumed, that the wear of a brake shoe which affords mechanical braking during regenerative braking can be avoided, and that the control apparatus 10D can be made small in size, without adding a brake chopper or an electric-double-layer capacitor to the control apparatus 10D. Besides, the adjustment setting temperatures of the in-room heater 26 and the in-room air conditioner 27 are simultaneously altered, thereby to attain the advantage that, while a pleasant in-room temperature is being realized, the regenerative energy of the DC power feed circuit 15 can be further consumed.

By the way, in spring or autumn, the signals are set in the same states as in either summer or winter. In this case, the in-room heater 26 or the in-room air conditioner 27 is normally started by the voltage generation table 34, but in the inverter stop state SC, the adjustment setting temperature thereof is set in correspondence with spring or autumn, and the in-room heater 26 or the in-room air conditioner 27 which is started by the output LDSa of the voltage generation table 34 is brought into the low load state.

Embodiment 6

FIG. 11 is a block diagram showing Embodiment 6 of a control apparatus for an electric train according to this invention, while FIG. 12 is a block diagram showing the details of load control means 30E for use in Embodiment 6.

The control apparatus for the electric train in this embodiment 6 is indicated by reference sign 10E. This control apparatus 10E for the electric train has the load control means 30E, by which an in-room heater 26 and an in-room air conditioner 27 that form the load 25 of an auxiliary power source device 22 are controlled. The load control means 30E is supplied with an inverter state signal ICS from an inverter 12, and DC power feed information DIF from detection means 20. The inverter state signal ICS includes an inverter state signal ICS-FD/FB/SC and an inverter state signal ICS-FD/FB. The load control means 30E ON/OFF-controls the in-room heater 26 and the in-room air conditioner 27 and also controls the load states thereof, on the basis of these inverter state signals ICS-FD/FB/SC and ICS-FD/FB and the DC power feed information DIF. The others are configured to be the same as in Embodiment 1.

As shown in FIG. 12, the load control means 30E has four voltage generation tables 41, 42, 43 and 44. The voltage generation table 41 is supplied with the inverter state signal ICS-FD/FB/SC. The inverter state signal ICs-FD/FB/SC becomes a high level signal in any of a state where a power running command FD is given to the inverter 12, a state where a regenerative braking command FB is given to the inverter 12, and a state where the inverter 12 has fallen into an inverter stop state SC, so that the voltage generation table 41 sets a load start signal LDSa at an ON signal normally irrespective of whether the inverter 12 is generating a converted output voltage or is not generating the converted output voltage.

The voltage generation table 42 is supplied with the inverter state signal ICS-FD/FB. This inverter state signal ICS-FD/FB becomes a high level signal in the state where the power running command FD is given to the inverter 12, and the state where the regenerative braking command FB is given to the inverter 12. The voltage generation table 42 sets a load start signal LDSb at an ON signal on the basis of the inverter state signal ICS-FD/FB, when this inverter state signal ICS-FD/FB has become the high level signal, in other words, when the inverter 12 is generating the converted output voltage.

The voltage generation tables 43 and 44 are supplied with the DC power feed information DIF. The voltage generation table 43 generates a heater-set-temperature control signal LDT1 on the basis of the DC power feed information DIF, and the voltage generation table 44 generates a air conditionerset-temperature control signal LDT2. As in Embodiment 2, the DC power feed information DIF is a signal which represents the DC voltage VD of a DC power feed circuit 15. When the DC voltage VD has exceeded a predetermined voltage value VD1, the voltage generation table 43 enlarges the heater-set-temperature control signal LDT1 on the basis of the DC power feed information DIF and in proportion to the magnitude of the excess voltage value (VD-VD1), thereby to raise an adjustment setting temperature for the in-room heater 26 and to control this in-room heater 26 into a high load state. Besides, when the DC voltage VD has exceeded the predetermined voltage value VD1, the voltage generation table 44 lowers the air conditioner-set-temperature control signal LDT2 on the basis of the DC power feed information DIF and in proportion to the magnitude of the excess voltage value (VD-VD1), thereby to lower an adjustment setting temperature for the in-room air conditioner 27 and to control this in-room air conditioner 27 into a high load state.

In Embodiment 5, on the basis of the inverter state signal ICS-FD/FB, the in-room heater 26 or the in-room air conditioner 27 has been ON/OFF-controlled, and conjointly, the in-room heater 26 and the in-room air conditioner 27 have been controlled so as to change their load states, whereas in this embodiment 6, the inverter state signal ICS-FD/FB and the DC power feed information DIF are supplied to the load control means 30E, and the in-room heater 26 or the in-room air conditioner 27 is ON/OFF-controlled on the basis of the inverter state signal ICS-FD/FB, and conjointly, the load states of the in-room heater 26 and the in-room air conditioner 27 are changed on the basis of the DC power feed information DIF.

The load start signals LDSa and LDSb which are outputted from the load control means 30E are set into the following first states in summer:

Load start signal LDSa: Start signal for in-room air conditioner 27

Load start signal LDSb: Start signal for in-room heater 26

Concretely, in summer, the load start signal LDSa of the voltage generation table 41 normally becomes the ON signal on the basis of the inverter state signal ICS-FD/FB/SC, and the in-room air conditioner 27 is normally started by the ON signal of the load start signal LDSa. When the power running command FD or the regenerative braking command FB is given to the inverter 12, the load start signal LDSb of the voltage generation table 42 becomes the ON signal. The in-room heater 26 is started by the ON signal of the load start signal LDSb. Besides, when the DC voltage VD exceeds the predetermined voltage value VD1, the heater-set-temperature control signal LDT1 rises in proportion to the magnitude of the excess voltage value (VD-VD1), and the consumption energy of the in-room heater 26 increases in proportion to the excess voltage value (VD-VD1). Simultaneously, the air conditioner-set-temperature control signal LDT2 lowers, and the consumption energy of the in-room air conditioner 27 increases in proportion to the excess voltage value (VD-VD1).

In other words, in summer, the in-room air conditioner 27 is normally operated on the basis of the inverter state signal ICS-FD/FB/SC, thereby to normally cool the interior of a car room. Here, when the power running command FD or the regenerative braking command FB is given to the inverter 12 in the ON state of the in-room air conditioner 27, the in-room heater 26 is brought into its ON state on the basis of the inverter state signal ICS-FD/FB. Conjointly, when the DC voltage VD exceeds the predetermined voltage value VD1, the in-room air conditioner 27 and the in-room heater 26 fall into the high load states in proportion to the magnitude of the excess voltage value (VD-VD1), and the regenerative energy of the DC power feed circuit 15 can be effectively consumed by the operations of the in-room air conditioner 27 and the in-room heater 26 in the high load states.

The load start signals LDSa and LDSb which are outputted from the load control means 30E are set into the following second states in winter:

Load start signal LDSa: Start signal for in-room heater 26

Load start signal LDSb: Start signal for in-room air conditioner 27

Concretely, in winter, the load start signal LDSa of the voltage generation table 41 normally becomes the ON signal on the basis of the inverter state signal ICS-FD/FB/SC, and the in-room heater 26 is normally started by the ON signal of the load start signal LDSa. When the power running command FD or the regenerative braking command FB is given to the inverter 12, the load start signal LDSb of the voltage generation table 42 becomes the ON signal. The in-room air conditioner 27 is started by the ON signal of the load start signal LDSb. Besides, when the DC voltage VD exceeds the predetermined voltage value VD1, the heater-set-temperature control signal LDT1 rises in proportion to the magnitude of the excess voltage value (VD-VD1), and the air conditioner-set-temperature control signal LDT2 lowers, whereby the in-room heater 26 and the in-room air conditioner 27 are brought into the high load states.

In other words, in winter, the in-room heater 26 is normally held in the ON state on the basis of the inverter state signal ICS-FD/FB/SC, thereby to normally heat the interior of the car room. Here, when the power running command FD or the regenerative braking command FB is given to the inverter 12 in the ON state of the in-room heater 26, the in-room air conditioner 27 is brought into its ON state on the basis of the inverter state signal ICS-FD/FB. Conjointly, when the DC voltage VD exceeds the predetermined voltage value VD1, the in-room air conditioner 27 and the in-room heater 26 fall into the high load states in proportion to the magnitude of the excess voltage value (VD-VD1), and the regenerative energy of the DC power feed circuit 15 can be effectively consumed by the operations of the in-room air conditioner 27 and the in-room heater 26 in the high load states.

In this embodiment 6, when the DC voltage VD exceeds the predetermined voltage value VD1 conjointly in the state where the power running command FD is given to the inverter 12 or in the state where the regenerative braking command FB is given to the inverter 12, the in-room heater 26 and the in-room air conditioner 27 are both operated in the high load states, and hence, the regenerative energy of the DC power feed circuit 15 is effectively consumed. Accordingly, also in Embodiment 6, as in Embodiment 1, there are attained the advantages that the regenerative energy can be effectively consumed, that the wear of a brake shoe which affords mechanical braking during regenerative braking can be avoided, and that the control apparatus 10E can be made small in size, without adding a brake chopper or an electric-double-layer capacitor to the control apparatus 10E. Besides, the adjustment setting temperatures of the in-room heater 26 and the in-room air conditioner 27 are simultaneously altered, thereby to attain the advantage that, while a pleasant in-room temperature is being realized, the regenerative energy of the DC power feed circuit 15 can be further consumed.

Incidentally, also in Embodiment 6, in spring or autumn, the signals are set in the same states as in either summer or winter. In this case, the in-room heater 26 or the in-room air conditioner 27 is normally started by the voltage generation table 41, but in an inverter stop state SC, the adjustment setting temperature thereof is set in correspondence with spring or autumn, and the in-room heater 26 or the in-room air conditioner 27 which is started by the output LDSa of the voltage generation table 41 is brought into a low load state.

Embodiment 7

FIG. 13 is a block diagram showing Embodiment 7 of a control apparatus for an electric train according to this invention, while FIG. 14 is a block diagram showing the details of load control means 30F for use in Embodiment 7.

The control apparatus for the electric train in this embodiment 7 is indicated by reference sign 10F. This control apparatus 10F for the electric train controls an in-room heater 26 and an in-room air conditioner 27 which form the load 25 of an auxiliary power source device 22, by the load control means 30F. This load control means 30F has four voltage generation tables 41, 42, 43 and 44 likewise to the load control means 30E of Embodiment 6, and the voltage generation table 42 is supplied with DC power feed information DIF. The voltage generation table 42 sets a load start signal LDSb at an ON signal on the basis of the DC power feed information DIF. The others are configured to be the same as in Embodiment 6.

In this embodiment 7, in summer, the load start signal LDSa of the voltage generation table 41 normally becomes an ON signal on the basis of an inverter state signal ICS-FD/FB/SC, and the in-room air conditioner 27 is normally started by the ON signal of the load start signal LDSa. When a DC voltage VD exceeds a predetermined voltage value VD1, the load start signal LDSb of the voltage generation table 42 becomes the ON signal, and the in-room heater 26 is started by the ON signal of the load start signal LDSb. Besides, when the DC voltage VD exceeds the predetermined voltage value VD1, a heater-set-temperature control signal LDT1 rises, and a air conditioner-set-temperature control signal LDT2 lowers, in proportion to the magnitude of the excess voltage value (VD-VD1), whereby the in-room heater 26 and the in-room air conditioner 27 are brought into high load states.

In other words, in summer, the in-room air conditioner 27 is normally operated on the basis of the inverter state signal ICS-FD/FB/SC, thereby to normally cool the interior of a car room. Here, when the DC voltage VD exceeds the predetermined voltage value VD1 in the ON state of the in-room air conditioner 27, the in-room heater 26 is brought into its ON state on the basis of the DC power feed information DIF. Conjointly, when the DC voltage VD exceeds the predetermined voltage value VD1, the in-room air conditioner 27 and the in-room heater 26 fall into the high load states in proportion to the magnitude of the excess voltage value (VD-VD1), and the regenerative energy of a DC power feed circuit 15 can be effectively consumed by the operations of the in-room air conditioner 27 and the in-room heater 26 in the high load states.

In Embodiment 7, in winter, the load start signal LDSa of the voltage generation table 41 normally becomes the ON signal on the basis of an inverter state signal ICS-FD/FB/SC, and the in-room heater 26 is normally started by the ON signal of the load start signal LDSa. When the DC voltage VD exceeds the predetermined voltage value VD1, the load start signal LDSb of the voltage generation table 42 becomes the ON signal, and the in-room air conditioner 27 is started by the ON signal of the load start signal LDSb. Besides, when the DC voltage VD exceeds the predetermined voltage value VD1, the heater-set-temperature control signal LDT1 rises, and the air conditioner-set-temperature control signal LDT2 lowers, in proportion to the magnitude of the excess voltage value (VD-VD1), whereby the in-room heater 26 and the in-room air conditioner 27 are brought into the high load states.

In other words, in winter, the in-room heater 26 normally becomes the ON state on the basis of the inverter state signal ICS-FD/FB/SC, thereby to normally heat the interior of the car room. Here, when the DC voltage VD exceeds the predetermined voltage value VD1 in the ON state of the in-room heater, the in-room air conditioner 27 is brought into its ON state on the basis of the DC power feed information DIF. Conjointly, when the DC voltage VD exceeds the predetermined voltage value VD1, the in-room air conditioner 27 and the in-room heater 26 fall into the high load states in proportion to the magnitude of the excess voltage value (VD-VD1), and the regenerative energy of the DC power feed circuit 15 can be effectively consumed by the operations of the in-room air conditioner 27 and the in-room heater 26 in the high load states.

In this embodiment 7, when the DC voltage VD exceeds the predetermined voltage value VD1, the in-room heater 26 and the in-room air conditioner 27 are both operated in the high load states, and hence, the regenerative energy of the DC power feed circuit 15 is effectively consumed. Accordingly, also in Embodiment 7, as in Embodiment 1, there are attained the advantages that the regenerative energy can be effectively consumed, that the wear of a brake shoe which affords mechanical braking during regenerative braking can be avoided, and that the control apparatus 10F can be made small in size, without adding a brake chopper or an electric-double-layer capacitor to the control apparatus 10F. Besides, the adjustment setting temperatures of the in-room heater 26 and the in-room air conditioner 27 are simultaneously altered, thereby to attain the advantage that, while a pleasant in-room temperature is being realized, the regenerative energy of the DC power feed circuit 15 can be further consumed.

Incidentally, also in Embodiment 7, in spring or autumn, the signals are set in the same states as in either summer or winter. In this case, the in-room heater 26 or the in-room air conditioner 27 is normally started by the voltage generation table 41, but in an inverter stop state SC, the adjustment setting temperature thereof is set in correspondence with spring or autumn, and the in-room heater 26 or the in-room air conditioner 27 which is started by the output LDSa of the voltage generation table 41 is brought into a low load state.

INDUSTRIAL APPLICABILITY

A control apparatus for an electric train according to this invention is utilized in various electric trains in which inverters are mounted.

Figure 1:
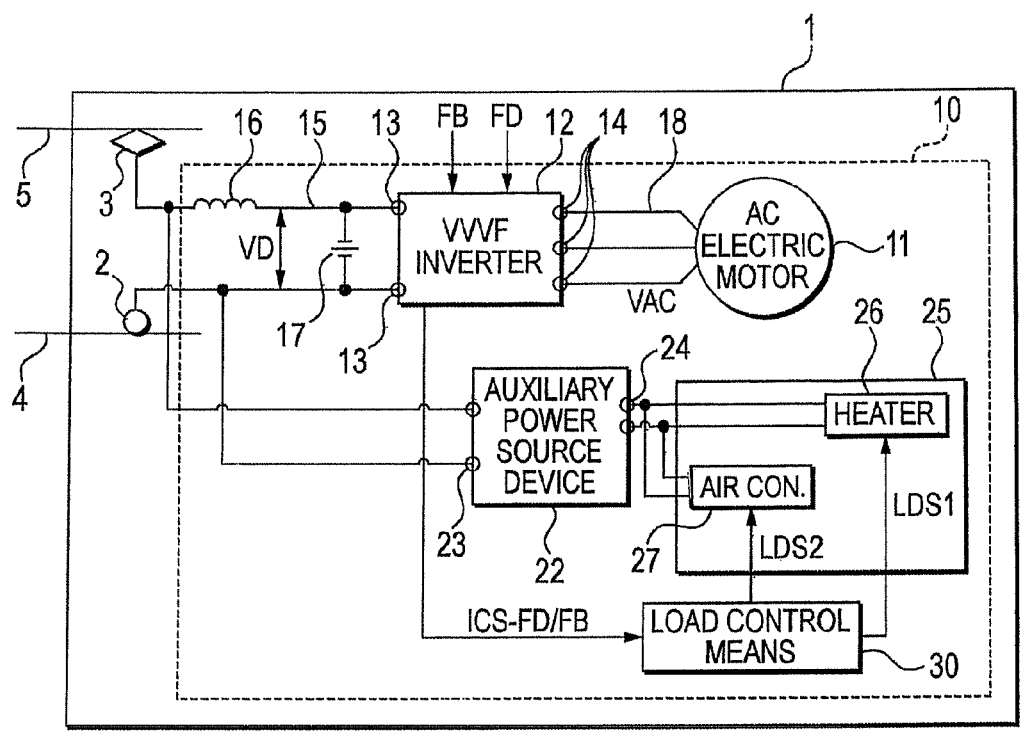
FIG. 1 It is a block diagram showing Embodiment 1 of a control apparatus for an electric train according to this invention.
Figure 2:
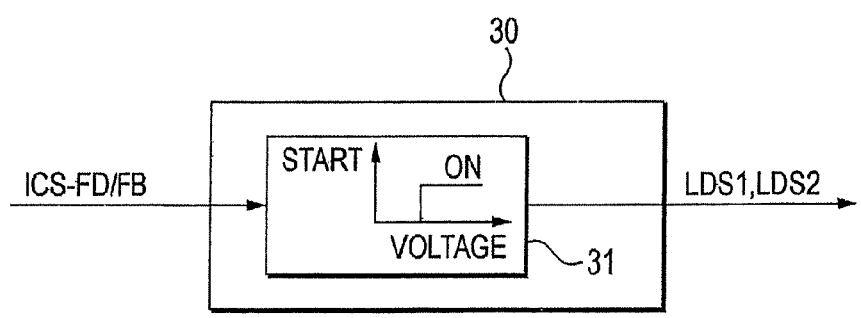
FIG. 2 It is a block diagram showing the details of load control means in Embodiment 1.
Figure 3:
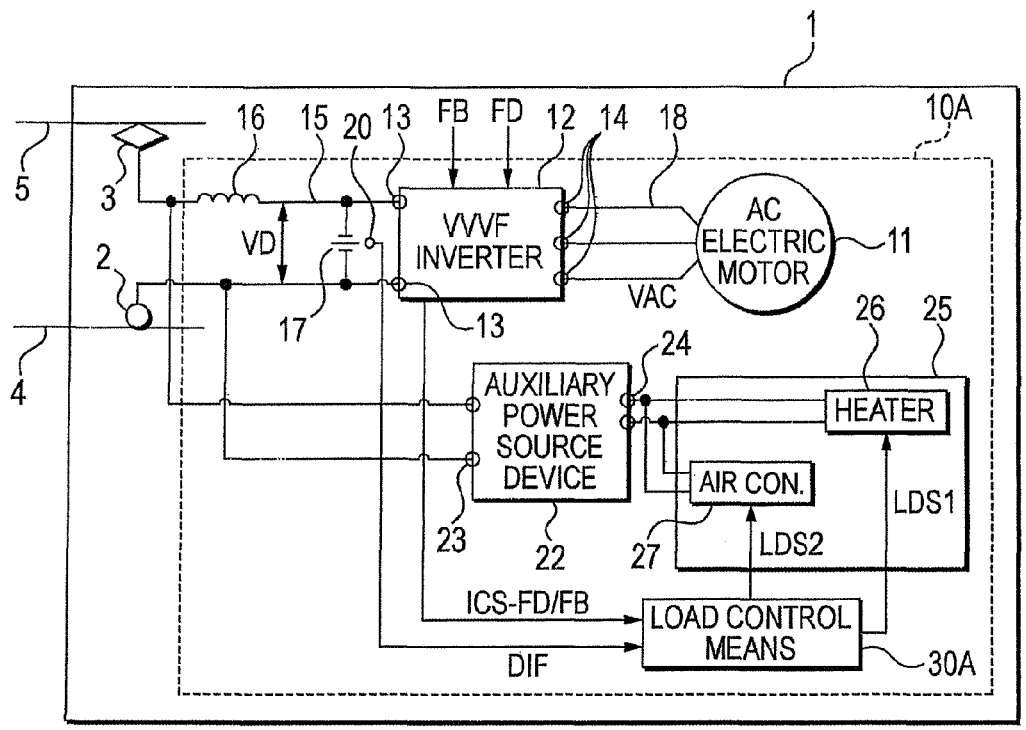
FIG. 3 It is a block diagram showing Embodiment 2 of a control apparatus for an electric train according to this invention.
Figure 4:
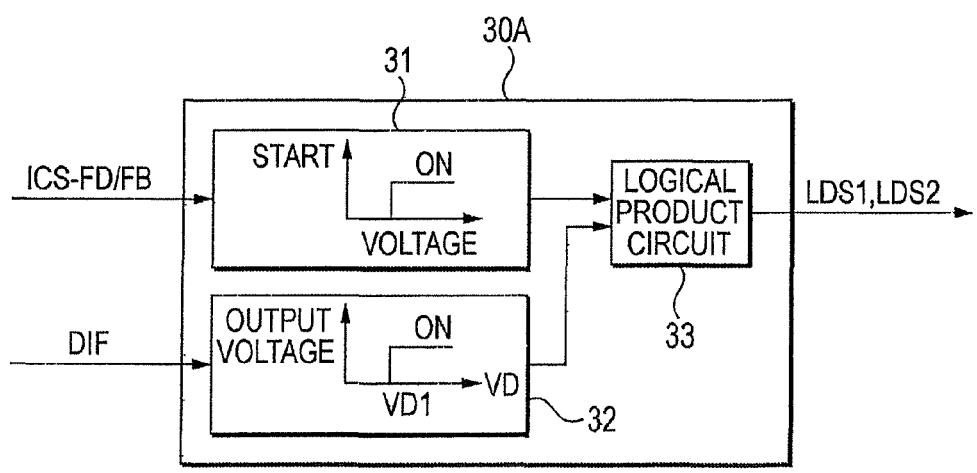
FIG. 4 It is a block diagram showing the details of load control means in Embodiment 2.
Figure 5:
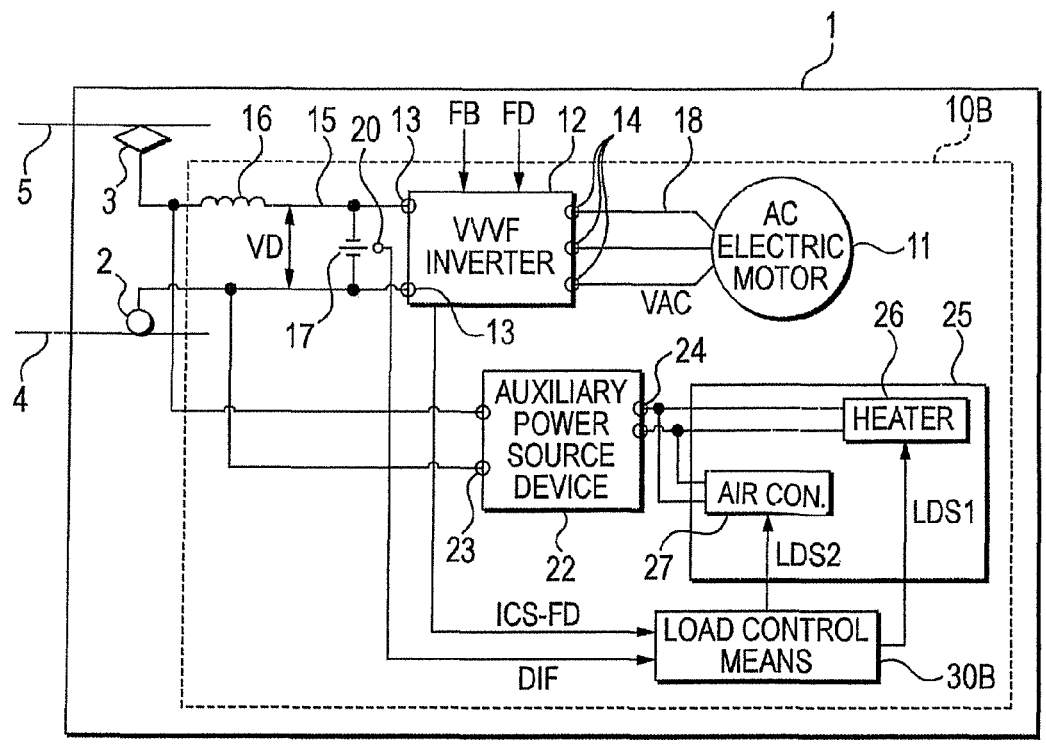
FIG. 5 It is a block diagram showing Embodiment 3 of a control apparatus for an electric train according to this invention.
Figure 6:
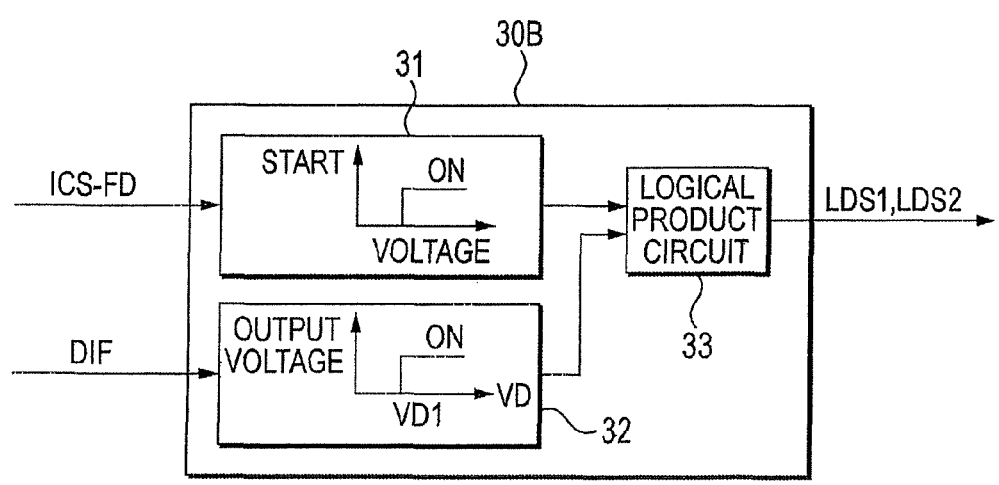
FIG. 6 It is a block diagram showing the details of load control means in Embodiment 3.
Figure 7:
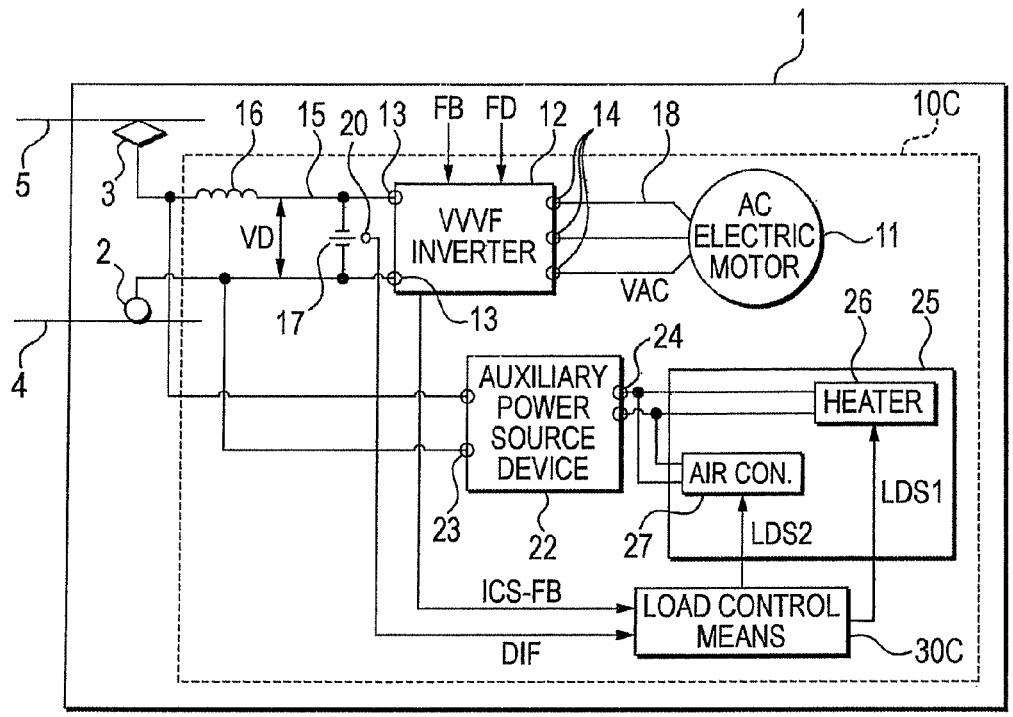
FIG. 7 It is a block diagram showing Embodiment 4 of a control apparatus for an electric train according to this invention.
Figure 8:
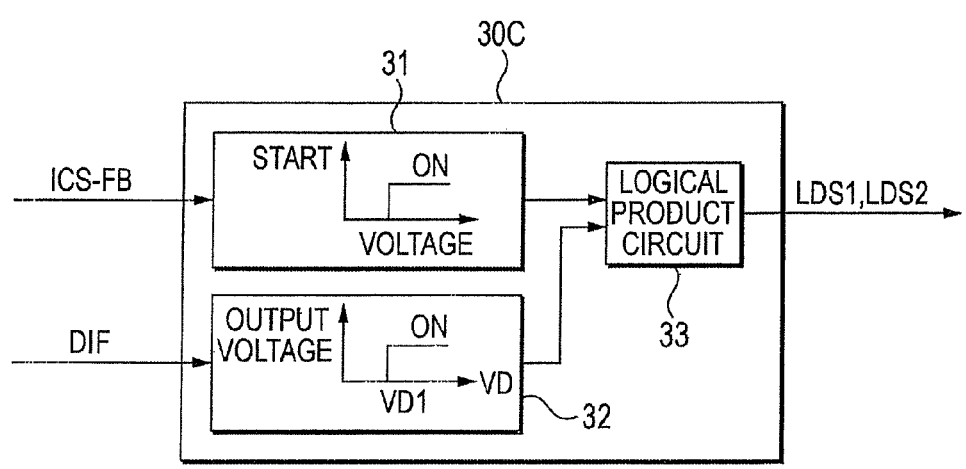
FIG. 8 It is a block diagram showing the details of load control means in Embodiment 4.
Figure 9:
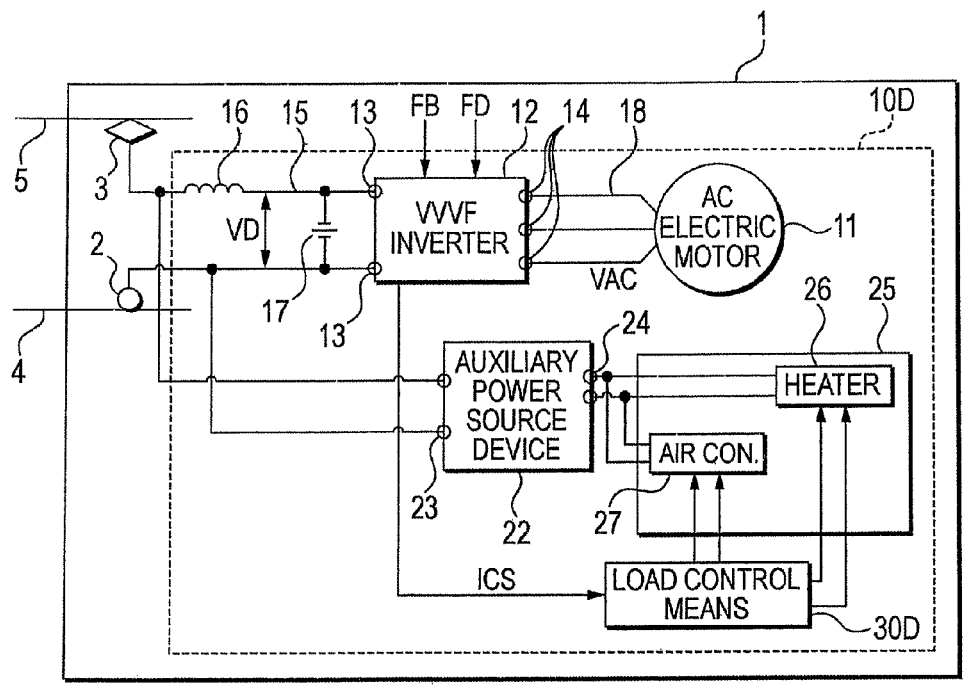
FIG. 9 It is a block diagram showing Embodiment 5 of a control apparatus for an electric train according to this invention.
Figure 10:
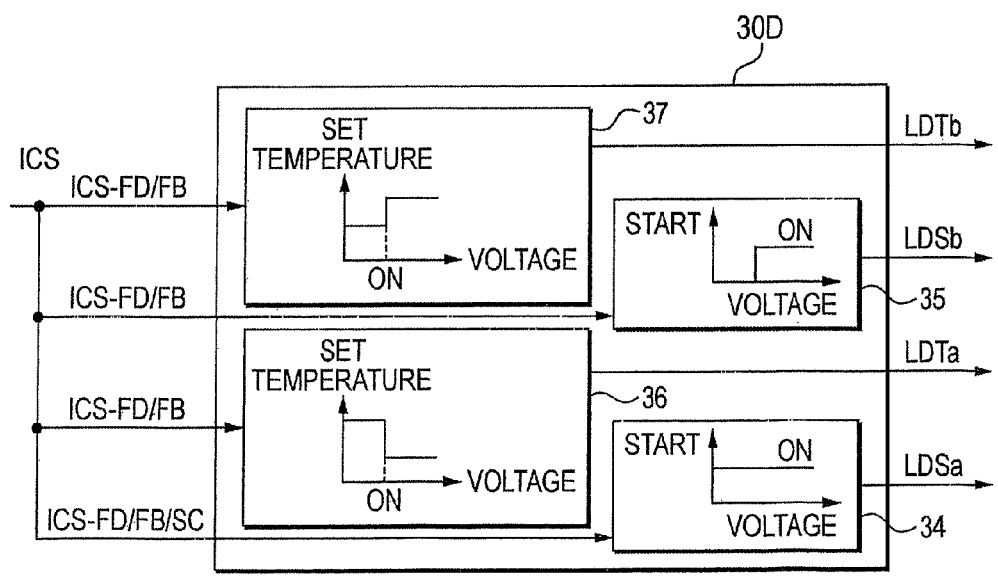
FIG. 10 It is a block diagram showing the details of load control means in Embodiment 5.
Figure 11:
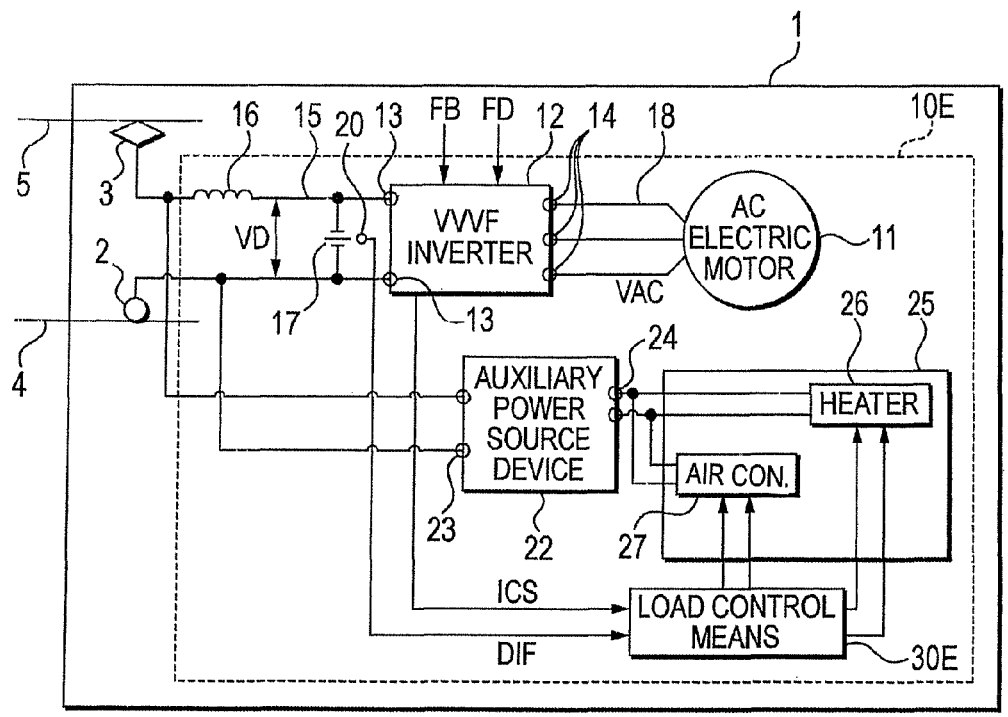
FIG. 11 It is a block diagram showing Embodiment 6 of a control apparatus for an electric train according to this invention.
Figure 12:
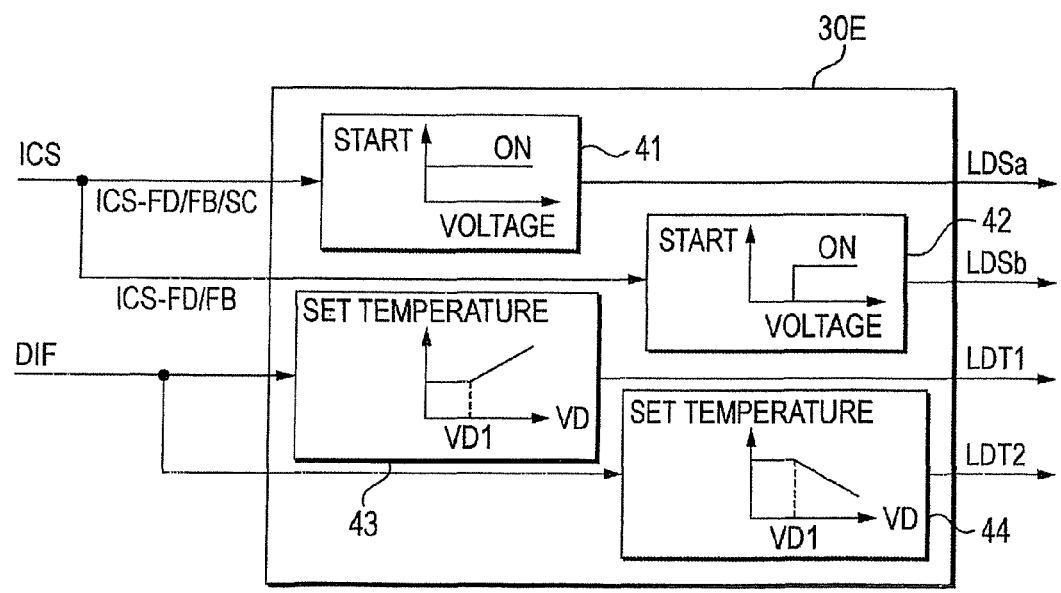
FIG. 12 It is a block diagram showing the details of load control means in Embodiment 6.
Figure 13:
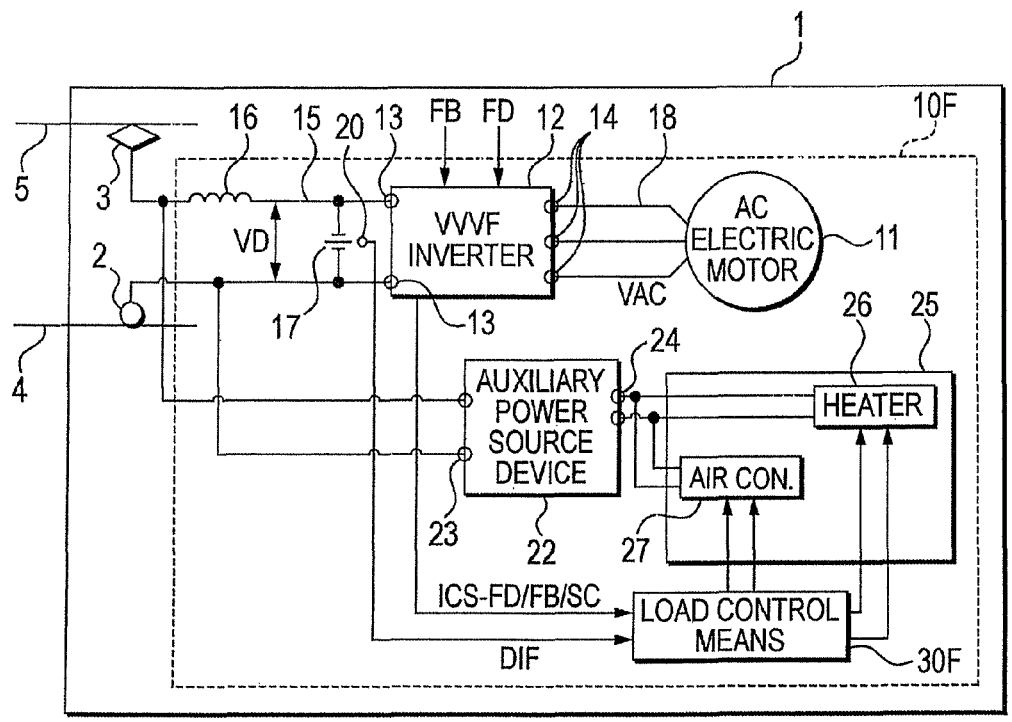
FIG. 13 It is a block diagram showing Embodiment 7 of a control apparatus for an electric train according to this invention.
Figure 14:
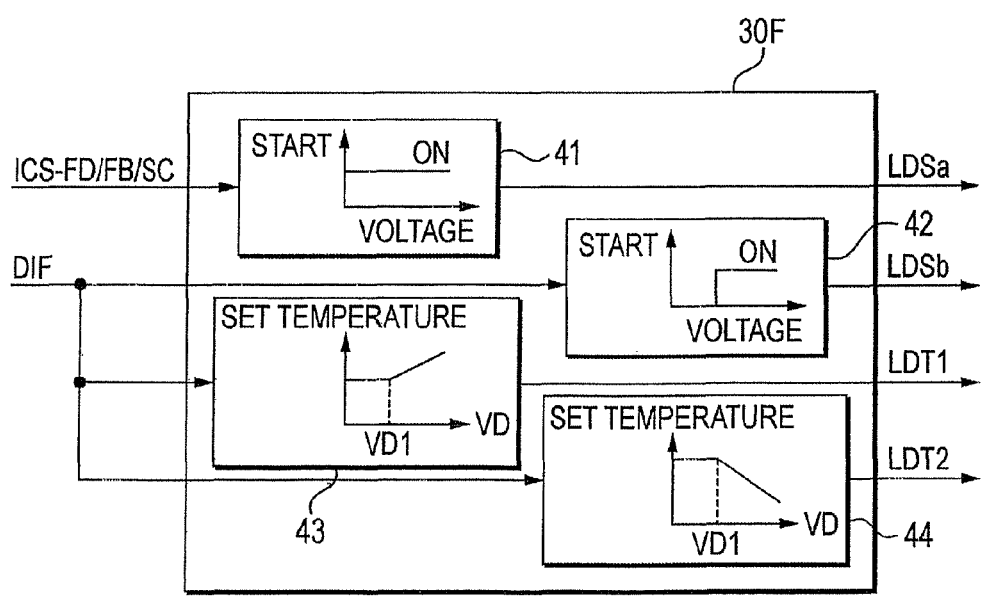
FIG. 14 It is a block diagram showing the details of load control means in Embodiment 7.

The invention claimed is:

1. A control apparatus for an electric train, configured including an AC electric motor which drives the electric train, and a variable-voltage variable-frequency inverter which controls the AC electric motor, wherein the variable-voltage variable-frequency inverter has DC side terminals which are connected to a DC power feed circuit of the electric train, and AC side terminals which are connected to the AC electric motor, and wherein, in a power running state of the electric train, the variable-voltage variable-frequency inverter converts DC electric power fed from the DC power feed circuit to the DC side terminals, into AC electric power, so as to feed the AC electric power from the AC side terminals to the AC electric motor, while in a regenerative braking state of the electric train, it converts AC electric power fed from the AC electric motor to the AC side terminals, into DC electric power, so as to feed the DC electric power from the DC side terminals to the DC power feed circuit;
said control apparatus further including:
an auxiliary power source device connected to said DC power feed circuit; and
load control means for controlling a load connected to said auxiliary power source device;
wherein said load control means receives an inverter state signal representative of an operation state of said variable-voltage variable-frequency inverter from it, and said load control means controls the load in accordance with the inverter state signal.

2. The control apparatus for the electric train as defined in claim 1, wherein said load control means ON/OFF-controls the load in accordance with the inverter state signal.

3. The control apparatus for the electric train as defined in claim 2, wherein when the inverter state signal is a signal representative of a state where at least either of a power running command and a regenerative braking command is given to said variable—voltage variable-frequency inverter, said load control means controls the load into an ON state.

4. The control apparatus for the electric train as defined in claim 1, wherein the control apparatus further includes detection means for detecting DC power feed information representative of a DC power feed state of said DC power feed circuit, and said load control means ON/OFF-controls the load in accordance with the inverter state signal and the DC power feed information.

5. The control apparatus for the electric train as defined in claim 4, wherein the inverter state signal is a signal representative of a state where at least either of a power running command and a regenerative braking command is given to said variable-voltage variable-frequency inverter, while the DC power feed information represents a DC voltage of said DC power feed circuit, and when the DC voltage has exceeded a predetermined voltage value, said load control means controls the load into an ON state.

6. The control apparatus for the electric train as defined in claim 1, wherein said load control means changes a load state of the load in accordance with the inverter state signal.

7. The control apparatus for the electric train as defined in claim 6, wherein said control apparatus further includes detection means for detecting DC power feed information representative of a DC power feed state of said DC power feed circuit, and said load control means changes a load state of the load in accordance with the inverter state signal and the DC power feed information.

8. The control apparatus for the electric train as defined in claim 6, wherein when the inverter state signal is a signal representative of a state where at least either of a power running command and a regenerative braking command is given to said variable-voltage variable-frequency inverter, said load control means changes the load into a high load state.

9. The control apparatus for the electric train as defined in claim 1, wherein the load includes an in-room heater and an in-room air conditioner which use an output voltage of said auxiliary power source device as a power source.

10. A control apparatus for an electric train, configured including an AC electric motor which drives the electric train, and a variable-voltage variable-frequency inverter which controls the AC electric motor, wherein the variable-voltage variable-frequency inverter has DC side terminals which are connected to a DC power feed circuit of the electric train, and AC side terminals which are connected to the AC electric motor, and wherein, in a power running state of the electric train, the variable-voltage variable-frequency inverter converts DC electric power fed from the DC power feed circuit to the DC side terminals, into AC electric power, so as to feed the AC electric power from the AC side terminals to the AC electric motor, while in a regenerative braking state of the electric train, it converts AC electric power fed from the AC electric motor to the AC side terminals, into DC electric power, so as to feed the DC electric power from the DC side terminals to the DC power feed circuit;
said control apparatus further including:
an auxiliary power source device connected to said DC power feed circuit;
load control means for controlling a load connected to said auxiliary power source device; and
detection means for detecting DC power feed information representative of a DC power feed state of said DC power feed circuit;
wherein said load control means controls the load in accordance with the DC power feed information.

11. The control apparatus for the electric train as defined in claim 10, wherein said load control means ON/OFF-controls the load in accordance with the DC power feed information.

12. The control apparatus for the electric train as defined in claim 11, wherein the DC power feed information represents a DC voltage of said DC power feed circuit, and when the DC voltage has exceeded a predetermined voltage value, said load control means controls the load into an ON state.

13. The control apparatus for the electric train as defined in claim 10, wherein said load control means changes a load state of the load in accordance with the DC power feed information.

14. The control apparatus for the electric train as defined in claim 13, wherein the DC power feed information represents a DC voltage of said DC power feed circuit, and when the DC voltage has exceeded a predetermined voltage value, said load control means controls the load into a high load state.

15. The control apparatus for the electric train as defined in claim 10, wherein the load includes an in-room heater and an in-room air conditioner which use an output voltage of said auxiliary power source device as a power source.

* * * * *